Figure 1:
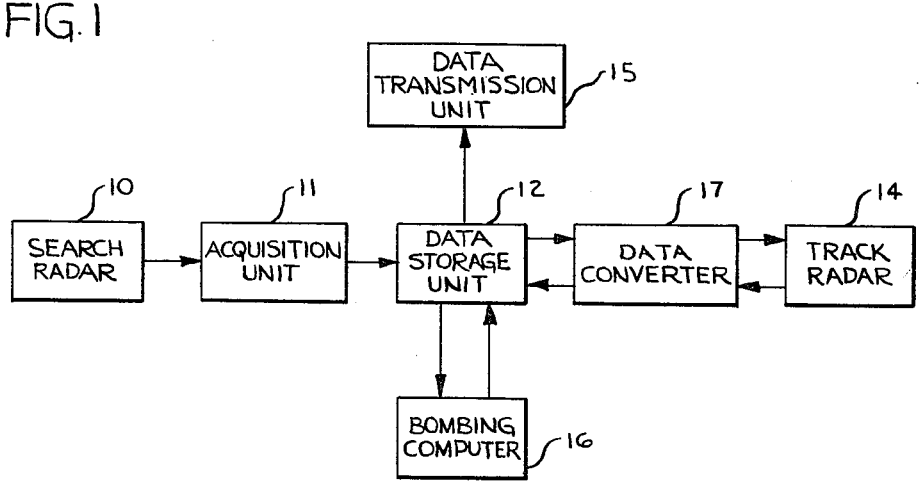

May 26, 1964    S. BARTH ETAL    3,134,972
MISSILE TRACKING AND CONTROL SYSTEM
Filed March 27, 1957    6 Sheets-Sheet 1

INVENTORS
SEYMOUR BARTH
RAWLEY D. McCOY
EDWIN K. STODOLA

BY  R. F. Spencer
AGENT

INVENTORS
SEYMOUR BARTH
RAWLEY D. McCOY
EDWIN K. STODOLA

BY  R. F. Spencer
AGENT

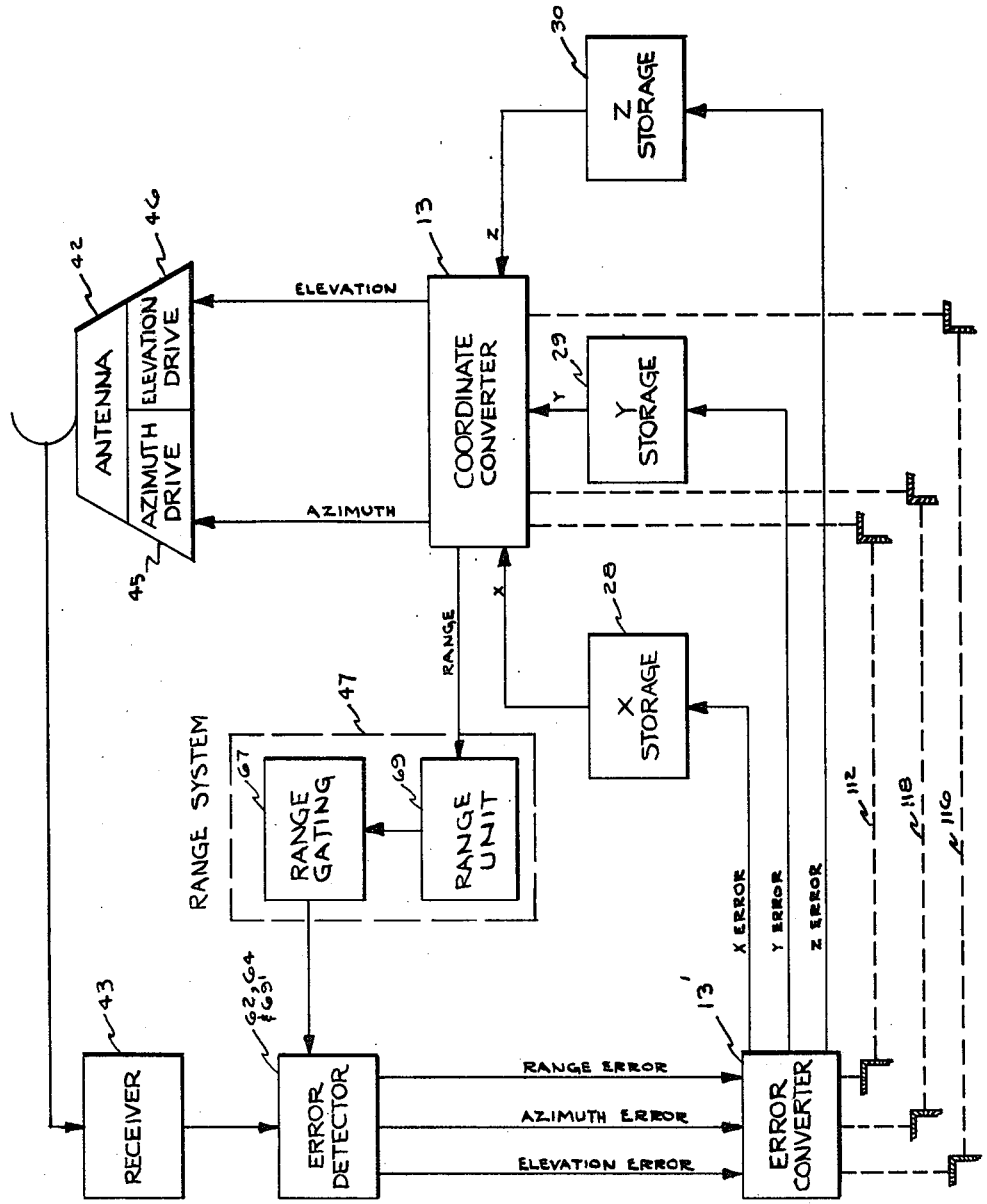

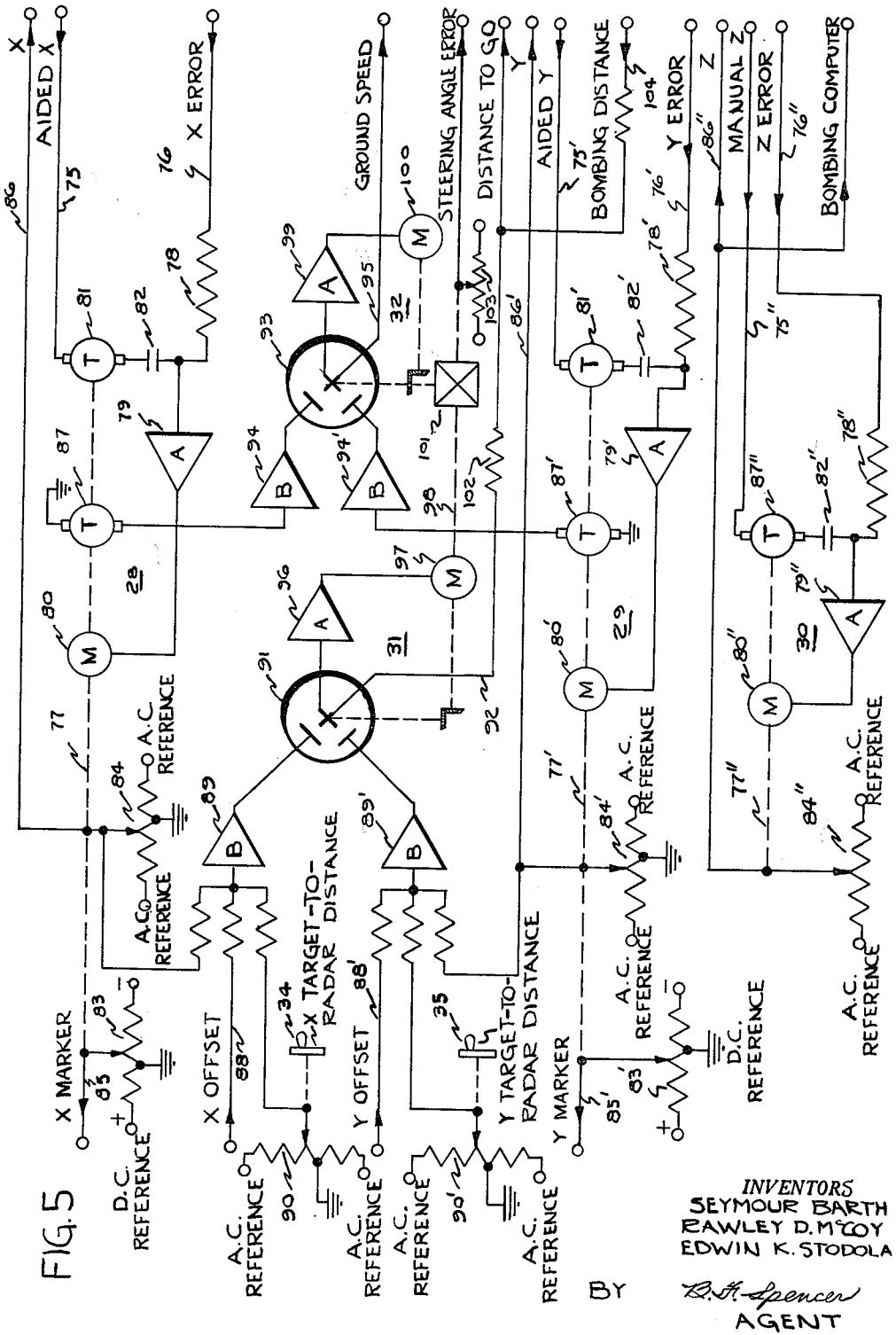

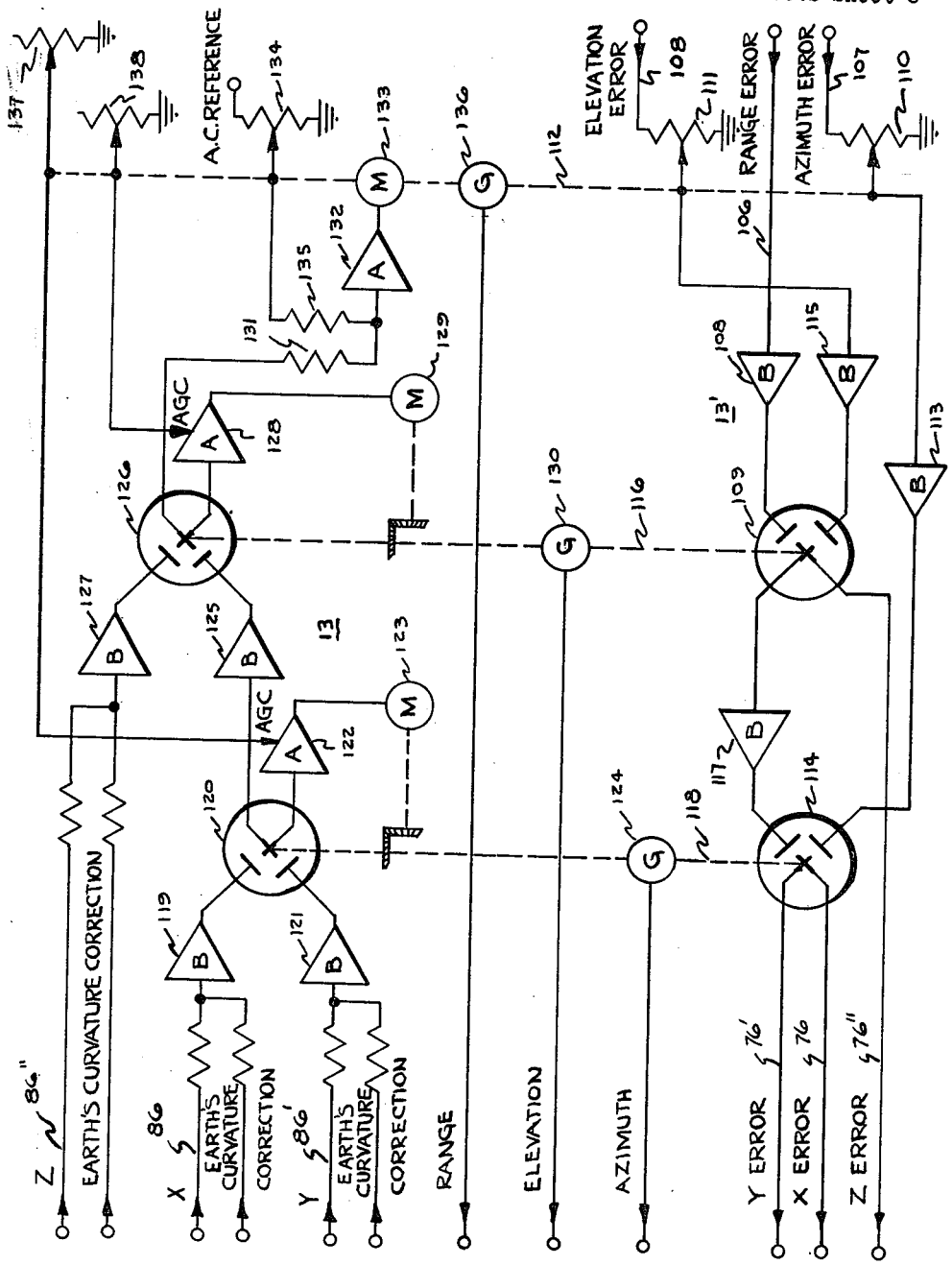

United States Patent Office 3,134,972
Patented May 26, 1964

3,134,972
MISSILE TRACKING AND CONTROL SYSTEM
Seymour Barth, Brooklyn, Rawley D. McCoy, Bronxville, and Edwin K. Stodola, Northport, N.Y., assignors, by mesne assignments, to Dynamics Corporation of America, New York, N.Y., a corporation of New York
Filed Mar. 27, 1957, Ser. No. 649,592
11 Claims. (Cl. 343—7.4)

This invention relates to electronic control systems and more specifically to a method and apparatus for controlling a plurality of missiles such as aircraft and other self-propelled devices, destined for the same or different targets and directing the missiles to their respective targets.

Although this invention is particularly useful for military purposes, it will become apparent that it may be employed in peacetime aircraft control to reduce personnel requirements and thus avoid the dangers normally encountered.

While many systems and methods involving the use of radar equipment have been employed for the guidance of missiles individually, none have been developed for the substantially simultaneous control of a plurality of missiles along two or more different courses. Accordingly, one object of the invention resides in the provision of a method and apparatus for acquiring control of one or more missiles, and tracking and guiding each missile toward selected destinations or targets. This is attained through the utilization of radar means for tracking each missile in sequence, and while tracking a particular missile determining its true position and course in order to transmit corrective information to the missile to guide it toward a predetermined target.

Another object of the invention is the provision of multiple tracking and guiding means wherein the computing equipment responsive to information pertaining to the present position and course of a missile, continuously computes the corrections to be transmitted to each missile in order to direct it toward its destination. Since this computation is a continuous one for each missile, the period between successive observations of a single missile does not affect the operation of the invention.

Still another object of the invention is the provision of data computing and storage means wherein the computers are utilized for performing the necessary computations for all aircraft while relative simple storage equipment need be utilized for each aircraft to store position information during the periodic tracking of each missile. By coordinating course predicting apparatus in conjunction with the storage equipment, the predicted course information for each missile will always be immediately available.

A further object of the invention is the provision of means for providing visual information pertaining to the error encountered with each missile so that the accuracy of the equipment can be constantly observed to insure proper operation thereof.

A still further object of the invention is the provision of a multiple missile control system and apparatus wherein means are included for altering the tracking sequence so that more frequent control can be exercised over missiles nearing their targets to insure highly accurate direction of each missile. This is important in connection with missile carrying bomb loads as they must be dropped at an accurately calculated position relative to the target as determined by the altitude and speed of the missile in order to insure neutralization of such target.

The above and other objects and advantages of the invention will become more apparent from the following description and accompanying drawings forming part of this application.

Figure 7:
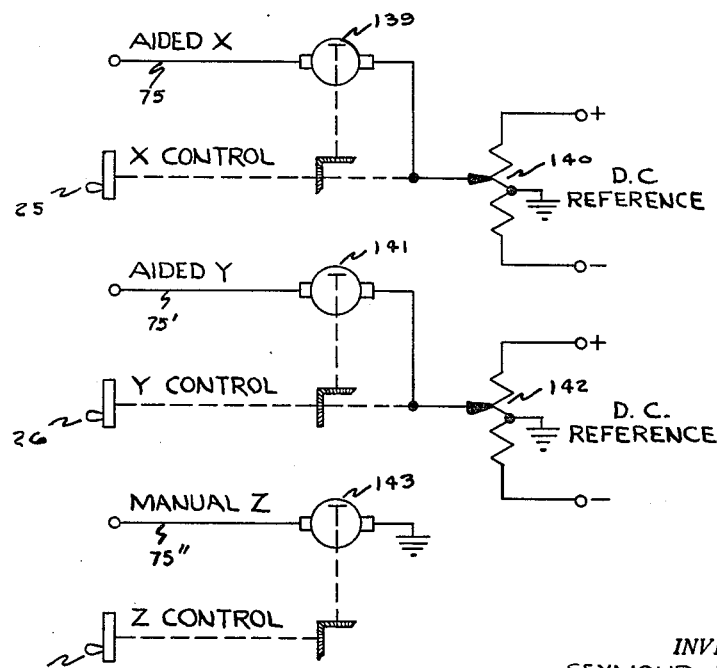
Figure 2:
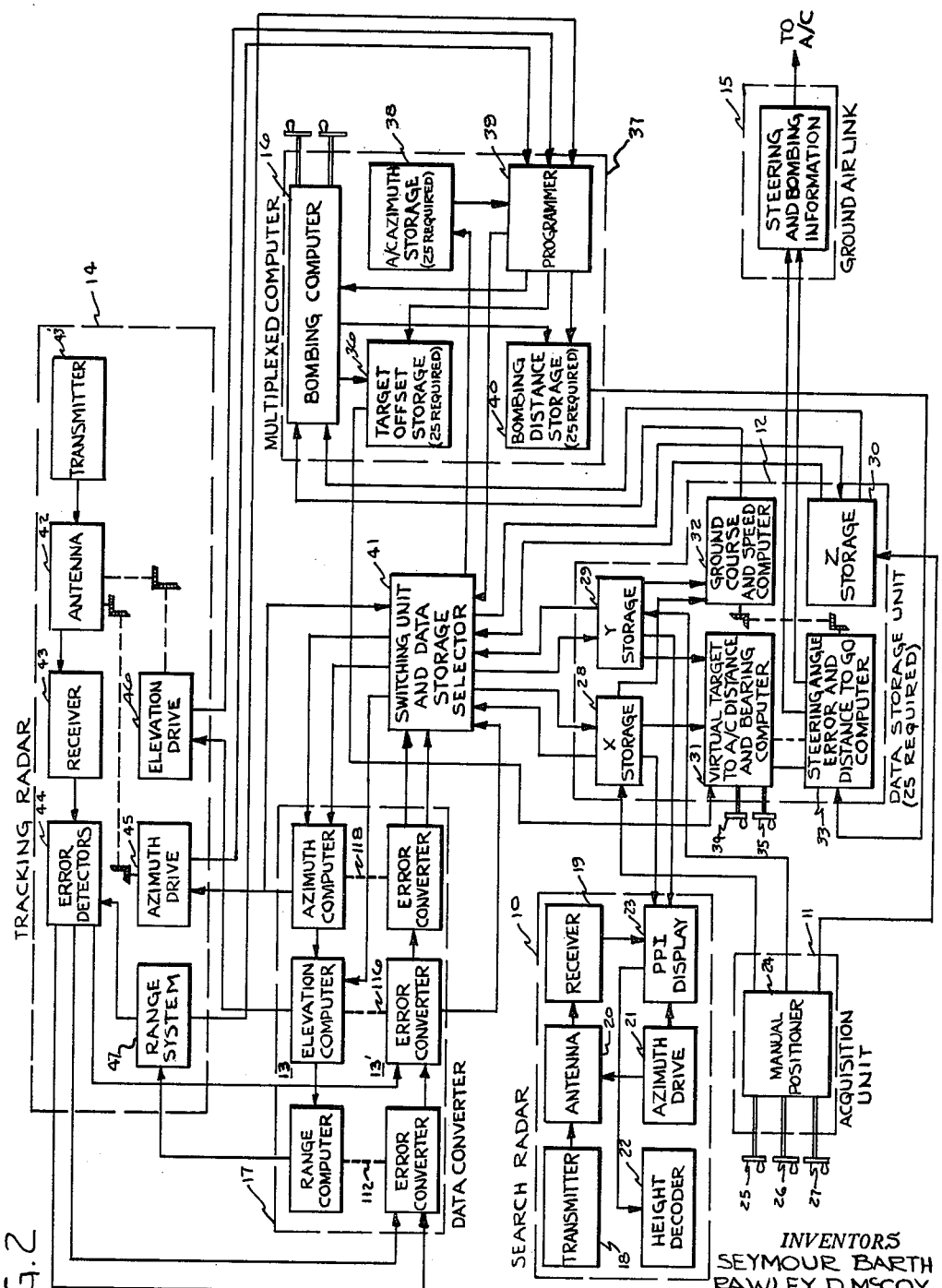
Figure 3:
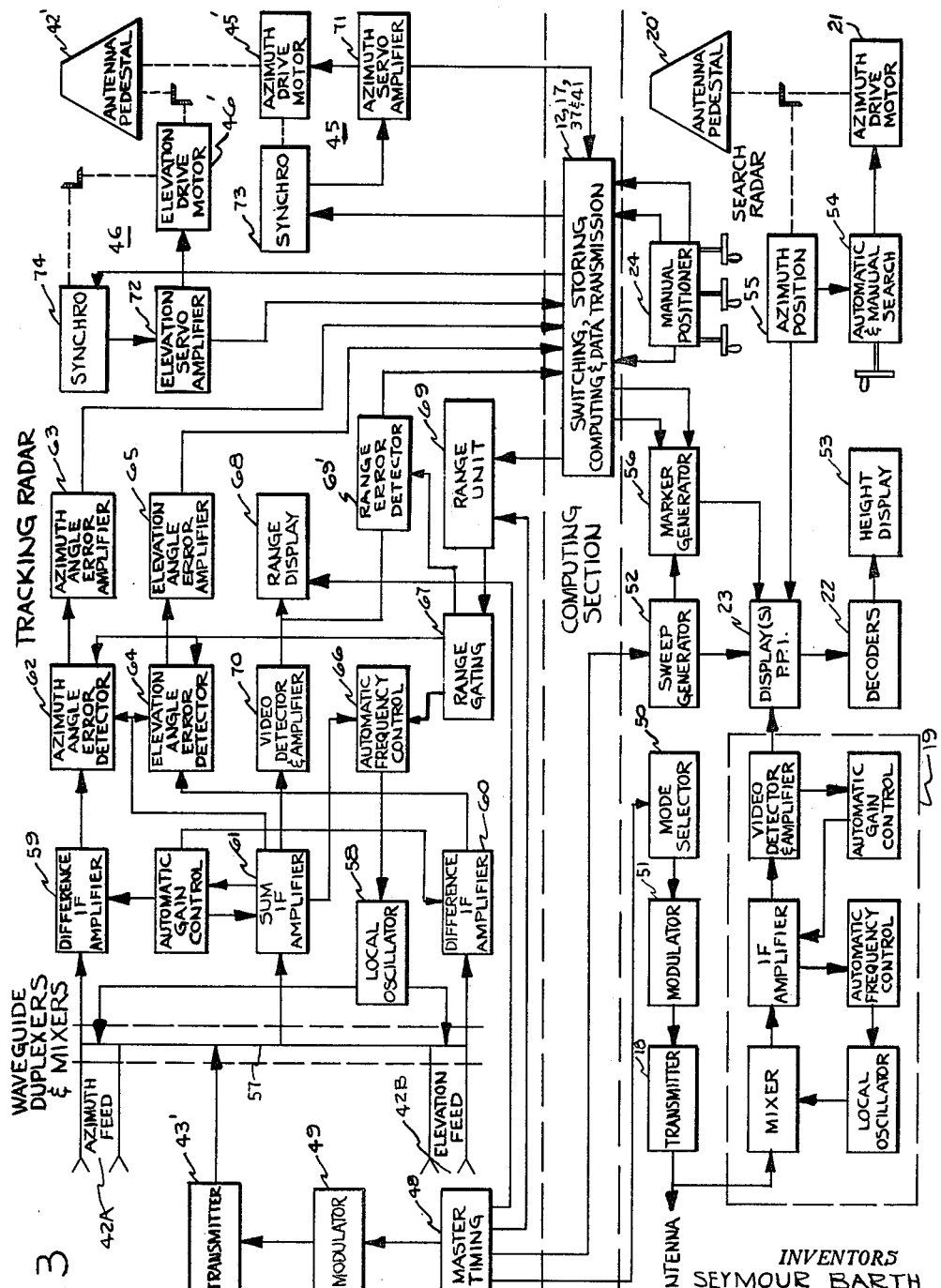

In the drawings:
FIG. 1 is a block diagram of one embodiment of the invention showing generally the operating elements and their coordination one with the others;
FIG. 2 is a block diagram of the preferred embodiment of FIG. 1 but in substantially greater detail for the purpose of illustrating certain aspects of the invention;
FIG. 3 is a detailed block diagram of the searching and tracking radar equipment of FIG. 1;
FIG. 4 is one embodiment of a tracking radar loop in accordance with the invention;
FIG. 5 is a schematic diagram of a data storage unit as illustrated in FIG. 2;
FIG. 6 is a schematic diagram of the data converter shown in FIG. 2; and
FIG. 7 is a schematic diagram of the manual positioning means for use in connection with the invention.

Broadly the invention as pointed out above contemplates means for tracking a plurality of aircraft or missiles sequentially and controlling the course of each missile to guide it to a predetermined destination. The missiles are brought under control of the guidance means by suitable search radar equipment and the course and destination of a missile can be modified during the course of its flight. Through the utilization of radar equipment that is controlled to automatically slew from one missile to the next, as many as 25 or more missiles can be controlled in sequence so that each missile is located and its course corrected at least once in every 30 seconds. Moreover, the corrective course information is not determined pursuant to an initially computed course, but rather in accordance with presently determined position and its location with respect to the target. In this way, smoother and more accurate control of each missile is attained without encountering the problem of requiring missiles to accept extremely large course corrections. Furthermore, the multiplexing of the computing equipment coupled with the radar scanning means maintains the volume of equipment and consequent cost at a minimum.

Referring now to the drawings and specifically to FIG. 1, there is shown a block diagram illustrating the basic elements of the invention. The search radar 10 functions to locate each missile to be controlled by the apparatus in accordance with the invention, and may also be used for monitoring or checking the operation of the automatic control equipment. This latter feature will be described in greater detail as the specification proceeds. The search radar, in addition to enabling the equipment to assume control of a missile, includes a plan-position-indicator to display missile or aircraft position. The information obtained by the search radar equipment 10 is used to manually control acquisition unit 11. The operator controlling the acquisition unit selects the aircraft or missile to be controlled from the PPI display of search radar 10 and transfers range, azimuth, and altitude information to the data storage unit 12. There is one data storage unit per missile so that control of 25 missiles would require 25 units. Once information on a missile is fed to its data storage unit 12, subsequent guidance is substantially automatic.

The data storage units 12 are memory devices and store rate and position information pertaining to their respective missiles. In addition, each storage unit continuously predicts the position of the missile for use in subsequent computations and in positioning the tracking radar 14. Moreover, each time that the tracking radar 14 looks at a specific missile, the position information of that missile is fed to the associated data storage unit 12 for correction of that unit. The data storage unit 12 also supplies data to and receives data from the bombing computer 16 and supplies data to the data transmission unit 15 for directing the flight of the controlled missile.

The data converter 17 connected between the data storage unit 12 and the tracking radar 14 converts the computed information from rectangular to polar coordinates and vice versa for coordination of the data storage unit with the tracking radar.

A complete block diagram of the time-shared tracking system in accordance with the invention is illustrated in FIG. 2. While the detail circuits of the various elements have not been shown, it will be understood that the functions ascribed to the several elements of this system can be attained by known methods and apparatus.

The search radar 10 is of conventional arrangement employing a transmitter 18, a receiver 19, a combined transmitting and receiving antenna 20, an azimuth antenna drive 21, a plan position indicator 23 and a height decoder 22. For convenience, a vertical fan-shaped radiation pattern is used for obtaining range and azimuth information which is displayed on PPI indicator 23. Altitude information is preferably obtained from coded signal transmitters or beacons on the missiles being guided and is displayed by the height decoder 22. When a missile to be guided has been launched, its initial path is followed by the search radar and the position information is prominently displayed for use by an operator at the acquisition unit 11.

The acquisition unit 11 includes a manual positioner 24 having three hand wheels 25 to 27 for setting information pertaining to the $x$, $y$, and $z$ coordinates of a missile being acquired or brought under control of the system. Signals representing these coordinates are fed to $x$, $y$, and $z$ storage units 28 to 30 forming part of each data storage unit 12. The data storage units 28 and 29 are in turn connected with the PPI display 23 on the search radar 10 which causes a circular marker to appear on the display. As soon as these circular markings are aligned with the position of the missile being acquired, the operator releases the associated data storage unit 12 and the operation is completed. Thereafter, the storage unit is controlled by the tracking radar 14 though the circles still appear on the PPI display for constantly checking the operation of the system. In the event it appears from the PPI display 23 that a missile is not being properly controlled, the operator can take control of the associated data storage unit 12 and re-acquire the missile in the manner previously described.

The data storage units 12 which are individual to each aircraft include a virtual target-to-aircraft distance and bearing computer 31, a ground course and speed computer 32, and a steering angle error and distance-to-go computer 33. The target distance and bearing computer 31 includes manually operable hand cranks 34 and 35 for inserting target-to-radar parallax voltages which together with target off-set due to wind obtained from the target off-set computer 36 of the multiplexed computer 37 enables the computation of virtual target distance and bearing. The ground course and speed computer 32 receives coordinate information from the storage units 28 and 29 and feeds the course and speed information to the steering error and distance computer 33. Computer 33 also receives information as to the virtual target distance and bearing, and the resultant information is fed to the data transmission unit 15 for transmission to the individual missile concerned.

In addition to the guidance of the aircraft toward a target, it is also important to determine the time and position at which the bombs are to be released. This is accomplished through the action of multiplexed computer 37 that includes among other elements the bombing computer 16. In this computer a single programmer 39 controls the sequence of operation with respect to each of the aircraft under its control on the basis of the time to go to the dump point and the time since the last look. In this way all aircraft can be tracked with a minimum loss of time. The tracking time for each aircraft is controlled by the programmer 39 and it causes the equipment to shift to the next aircraft as soon as position errors obtained by comparing the data from azimuth storage unit 38 and that from the tracking radar 14 go to zero. This null position indicates that the tracking radar 14 is tracking the missile, that the error information has been determined, and that new course information has been transmitted to the missile.

The programmer brings into operation the bombing distance computer 40 and target off-set computer 36 for each particular missile. These computers receive bombing information from the bombing computer 16 and modify the computations of the associated data storage unit 12 accordingly.

While a number of continuous computations are carried on for the purpose of anticipating the new position of each missile preparatory to the next tracking cycle, the target off-set and bombing distance change relatively slowly, hence the computers 36 and 40 merely function in response to data received from the bombing computer and are corrected periodically.

As previously pointed out, one data storage unit 12 is used for each aircraft to store data for use by the various computers. To attain the proper selection of computers, the programmer 39 controls the switching and data storage selector unit 41 which is connected with the $x$, $y$, and $z$ storage units 28, 29, and 30 of the data storage units 12. The switching unit transmits information from a selected data unit 12 through the data converter 17 to the tracking radar 14 to cause the radar to track the missile to be controlled. Tracking of the missile is accomplished in both range and direction by means of the antenna 42 and receiver 43. The tracking radar 14 also includes error detectors 44, antenna azimuth and elevation drives 45 and 46 and range position system 47. The data converter 17 performs the function of converting polar coordinate error data into rectangular data for storage in $x$, $y$, and $z$, and converting rectangular coordinate information to polar coordinate information for use by the radar 14. The polar coordinate error information from the radar is converted to rectangular coordinates and fed through the switching unit 41 to the data unit 12 to correct the $x$, $y$, $z$ position data stored therein. During the interim between successive scans of a given missile, the storage units 28, 29 and 30 continuously function to predict the new position of the missile being controlled thereby.

The search radar 10 of FIG. 2 is shown in more detail in the lower section of FIG. 3, while the tracking radar 14 is shown in more detail in the upper section thereof. Both of these equipments should preferably function at the same pulse repetition frequency, and synchronism is desirable to avoid overloading of the receiving channels should they be looking toward one another. This synchronism is accomplished by the master timing unit 48. In the search radar, timing pulses from the master timing unit 48 are fed to the mode selector 50 for triggering the modulator 51 which in turn energizes transmitter 18. The return echos or signals pass through the conventional receiver 19 and are displayed on the plan position indicator 23. Synchronism of the indicator 23 with the radar equipment is accomplished by the master timing unit 48 and sweep generator 52.

Altitude information when received from an aircraft or missile appears as a coded return on the indicator 23. The height display is picked up by a photoelectric probe that is fed to the decoder 22 and the mechanical height display indicator 53. The antenna pedestal 20' for supporting and rotating the antenna 20 is rotated by the drive motor 21 in turn controlled by automatic and manual controller 54. Antenna position information is fed to the indicator 23 by the azimuth position unit 55. The marking signal utilized to indicate acquisition of an aircraft or missile is transmitted to the PPI display 23 from the data storage unit 12 through the marker generator 56 as illustrated.

The tracking radar 14 is preferably of the amplitude-monopulse type having approximately a one-degree beam and a pulse repetition frequency of about 400 pulses per second synchronized by the master timing unit 48. Timing unit 48 is interconnected with the modulator 49 which energizes transmitter 43' to supply power over waveguide 57 to the azimuth and elevation antenna feeds 42A and 42B of the antenna 42. The received echo signal is divided into three separate signals namely an azimuth difference signal, an elevation difference signal and a signal corresponding to the sum of the signals received by antenna 42. A local oscillator 58 converts these signals into intermediate-frequency signals the first of which is fed to the azimuth difference intermediate-frequency amplifier 59, the second to the elevation difference I.F. amplifier 60, and the third or sum signal to the sum I.F. amplifier 61.

The signals from azimuth I.F. amplifier 59 and the sum I.F. amplifier 61 are now combined in the azimuth error detector 62. Error amplifier 63 produces an amplified error signal whose magnitude is proportional to the deviation of the aircraft or missile from the antenna beam axis and whose polarity determines the sense of this deviation. This error is coupled to the data converter 17 as previously described.

The elevation error is determined in a manner similar to the azimuth error by the elevation error detector 64. Automatic frequency control of the local oscillator 58 is provided by the control unit 66 connected between the amplifier 61 and oscillator 58.

The range gating 67 is triggered by range unit 69 and supplies range gating pulses to the angle error detectors 62 and 64 and to the range error detector 69'. The range error voltage from range error detector 69' is coupled to the data converter 17. A visual display unit 68 is provided for monitoring the signals from the tracking radar.

Referring now to the azimuth and elevation drives 45 and 46, it will be observed that they are not interconnected with the error detectors. These drives and their associated servo amplifiers 71 and 72 and synchros 73 and 74 are controlled directly from the computing and storing apparatus 12 and 17 as previously described. These drives position the antenna 42 toward the missile or aircraft and the drive signals are based on stored and smoothed information. The azimuth, elevation and range error signals from the tracking radar provide the computers with deviation information of the position of the aircraft relative to the beam axis of tracking antenna 42.

For the purpose of more clearly understanding the operation of the tracking radar discussed above, reference is made to the simplified block diagram of FIG. 4 showing the antenna 42 controlled by the $x$, $y$, and $z$ storage units 28, 29, and 30, coordinate converter 13 and the azimuth and elevation drives 45 and 46. The reflected echo signals are received by receiver 43 and applied to error detectors 62, 64, 69', error converters 13' and thence to the storage units 28 to 30. Thus, a closed-loop system is provided for the automatic storage of missile position in rectangular coordinates plus the control of the antenna pointing direction from the stored information.

FIG. 5 illustrates in greater detail the operation of the $x$, $y$, and $z$ storage units 28 to 30 respectively. In this figure, an aided $x$ control signal from the acquisition unit 11 is coupled over lead 75 to the D.C. tachometer 81 mechanically coupled to the shaft 77. The $x$ error signal from the error converter unit 13' is coupled over lead 76 and through resistor 78 to the input of amplifier 79. The output voltage from the tachometer 81 is also coupled through condenser 82 to the input of amplifier 79. The output voltage from amplifier 79 energizes servomotor 80 to position the shaft 77. This storage unit stores the $x$ position of the missile on the shaft 77.

The angular position of this shaft 77 is the double integral of the $x$ error signal. Where there is no aided $x$ input voltage on lead 75, the voltage at the input of amplifier 79 is the difference between the $x$ error voltage which is coupled through resistor 78 and the feedback voltage which is coupled through the condenser 82. This difference voltage is amplified and drives the servomotor 80 so as to vary the angular position of shaft 77 in accordance with the double integral of the $x$ error voltage. The feedback from the output of the amplifier 79 through the motor 80 which drives tachometer 81 and through condenser 82 insures the proper integral characteristic of the storage unit. Assuming the angular position of shaft 77 to vary as the double integral of the $x$ error voltage, then the voltage from the tachometer which is applied to condenser 82 will be proportional to the rate of change of the angular position of shaft 77 or according to the single integral of the applied $x$ error voltage. The feedback voltage component at the input of amplifier 79 coupled through condenser 82 varies according to the rate of change of the tachometer output voltage or according to the double derivative of the angular position of shaft 77. This feedback voltage component directly opposes the $x$ error control voltage.

This type of control system provides improved smoothing since constant velocity missiles can be tracked with negligible velocity error. Shaft 77 positions potentiometers 83 and 84, the former providing an $x$-marker voltage on lead 85 for use with the PPI display 23 of search radar 10, and the latter an $x$-position signal voltage for use by the coordinate converter 13. An A.C. tachometer 87 is coupled to shaft 77 for producing a voltage for use in the computation of ground speed and guidance signals to be described hereinafter.

The $y$ storage unit 29 receives an aided $y$ control signal from the acquisition unit 11 on lead 75' and a $y$ error voltage on lead 76' from error converter 13' in the same manner as described above in connection with the $x$ storage unit. The corresponding elements of the $y$ storage unit have been denoted by prime numerals, and its operation is identical with the operation of the $x$ storage unit.

The $z$ storage unit 30 operates in substantially the same manner as the $x$ and $y$ storage units, and the elements of the $z$ storage unit corresponding to the elements of the $x$ and $y$ storage units are denoted by like double prime numerals.

In the computations of the ground speed and guidance signals, the $x$ wind off-set voltage from computer 37 is coupled over lead 88 to booster amplifier 89 together with the $x$ position signal from the arm of potentiometer 84 and the $x$ target-to-radar distance from the arm of potentiometer 90. The output voltage of amplifier 89 is coupled to one stator winding of resolver 91 while a corresponding output voltage from amplifier 89' is coupled to the other stator winding. The induced voltage across one of the rotor windings of resolver 91 is amplified by amplifier 96 to energize servomotor 97 to automatically position the rotor winding to a null position. The angular position of the rotor shaft of resolver 91 and of shaft 98 represents the target-to-aircraft bearing. The induced voltage from the other rotor winding of resolver 91 is the virtual target-to-aircraft distance.

The $x$ component of velocity of the missile is coupled from the tachometer 87 to one of the stator windings of a second-servo driven resolver 93 through the booster amplifier 94. The $y$ component of velocity of the missile is coupled from tachometer 87' through booster amplifier 94' to the other stator winding. The voltage induced in one of the rotor windings of resolver 93 is amplified by amplifier 99 and energizes servomotor 100 to automatically drive the rotor winding to a null position. The angular position of the rotor shaft of resolver 93 represents the ground course of the missile. This shaft together with shaft 98 drives the mechanical differential 101 to produce steering angle error. The output shaft of differential 101 drives the arm of potentiometer 103 to provide an output voltage proportional to steering angle error which is coupled along with the distance-to-go signal to the data transmission unit 15. Distance-to-go is the difference between the virtual target to aircraft distance on lead 92 and the bombing distance on lead 104 obtained from bombing computer 37.

The x, y, and z error voltages for use in the x, y, and z storage units 28, 29, and 30 are produced by the error converter 13' which is shown in detail in FIG. 6. Range, azimuth, and elevation errors from the error detectors 62, 64, and 69' are coupled to the leads 106, 107, and 108, respectively. The range error voltage on lead 106 is coupled through booster amplifier 108 to one input of a D.C. resolver 109. The azimuth and elevation error voltages are supplied to linear potentiometers 110 and 111, respectively. The arms of these potentiometers are driven by range shaft 112, and the azimuth error voltage multiplied by range is coupled from the arm of potentiometer 110 through booster amplifier 113 to one input of D.C. resolver 114. The elevation error voltage multiplied by range is coupled from the arm of potentiometer 111 through booster amplifier 115 to the other input of D.C. resolver 109.

The rotor of D.C. resolver 109 is positioned by elevation shaft 116, and one output from this resolver is coupled through booster amplifier 117 to the other input of D.C. resolver 114. The other output from D.C. resolver 109 is the z error voltage and is coupled over lead 76" to the input of z storage unit 30.

The rotor of resolver 114 is positioned by the azimuth shaft 118. One of the outputs from resolver 114 is the x error voltage which is coupled over lead 76 to the x storage unit 28, and the other output is the y error voltage which is coupled over lead 76' to the y storage unit 29.

The x, y, and z error voltages are converted into x, y, and z position voltages by the x, y, and z storage units 28–30 as previously explained. These x, y, and z position voltages are coupled respectively over leads 86, 86' and 86" to the coordinate converter 13 shown in detail in the upper half of FIG. 6. The x position signal along with an earth's curvature correction voltage is coupled through booster amplifier 119 to one stator winding of A.C. resolver 120. The y position signal along with an earth's curvature correction voltage is coupled through booster amplifier 121 to the other stator winding of resolver 120. The voltage induced in one of the rotor windings of resolver 120 is amplified by amplifier 122 to excite servomotor 123 which automatically drives the rotor winding to a null position. The rotor shaft of resolver 120 is mechanically coupled to the shaft 118 of resolver 114, and the angular position of this shaft represents the azimuth of the missile being tracked. This azimuth shaft position is transmitted by the synchro generator 124 to the azimuth drive 45.

The induced voltage across the other rotor winding of resolver 120 is coupled through booster amplifier 125 to one stator winding of A.C. resolver 126. The z position signal on lead 86" along with an earth's curvature correction voltage is coupled through booster amplifier 127 to the other stator winding of resolver 126. The voltage induced across one of the rotor windings of resolver 126 is coupled through amplifier 128 to energize the servomotor 129 to automatically drive the rotor winding to a null position. The rotor shaft of resolver 126 is mechanically coupled to the elevation shaft 116 of resolver 109, and the angular position of this shaft represents the elevation of the target being tracked. The angular position of this shaft 116 is transmitted to the elevation drive 46 by the synchro generator 130.

The output voltage induced across the other rotor winding of resolver 126 is coupled through resistor 131 and amplifier 132 to excite servomotor 133. The servomotor 133 positions the arm of follow-up potentiometer 134 to couple a position signal through resistor 135 to the input of amplifier 132. The shaft of servomotor 133 is mechanically coupled to shaft 112 and represents the range of a target being tracked. The angular position of this shaft is transmitted by the synchro generator 136 to the range system 47.

The gains of amplifiers 122 and 128 are progressively decreased as the range to the target being tracked decreases. This is achieved by positioning the arms of potentiometers 137 and 138 by the range shaft 112. These potentiometers form part of the cathode circuit of the amplifiers 122 and 128 and provide increased cathode degeneration as the range to the target reduces.

The manual positioner unit 24 of acquisition unit 11 is shown in detail in FIG. 7. The hand wheel 25 positions both the armature of D.C. tachometer 139 and the arm of potentiometer 140. A D.C. reference voltage is applied across potentiometer 140 whose center position is coupled to ground. The output voltage from the potentiometer is coupled in series with the voltage generated by tachometer 139 and applied over lead 75 to the x storage unit 28. The manual positioner produces a voltage corresponding to the x position and the rate of change of the x position of the missile to be acquired in the same manner as in conventional aided tracking radars.

The hand wheel 26 similarly positions a D.C. tachometer 141 and the arm of potentiometer 142. A D.C. reference voltage is applied across potentiometer 142 whose center position is similarly grounded. An aided y voltage on lead 75' is coupled to the y storage unit 29. The hand wheels 25 and 26 are adjusted until a marker signal appears upon the PPI display 23 of radar 10 adjacent to the selected missile on the PPI indicator which is to be acquired and tracked.

The hand wheel 27 drives a D.C. tachometer 143 to produce a manual tracking voltage proportional to the rate of change of the z position of the missile to be acquired, and this manual positioning voltage is coupled over lead 75" to the z storage unit 30.

With the present invention any number of missiles or aircraft may be controlled by first locating the aircraft and assigning to it a data control unit, and then periodically checking its progress and transmitting guidance information to direct it to a predetermined target. The utilization of the guiding information may be accomplished either manually or automatically aboard the missile or aircraft. In addition, bombing information is also transmitted to the aircraft when it arrives in the target area.

The programmer enables a single tracking radar system to be used to a slew from one missile to the next for periods of time just sufficient to check the aircraft position and transmit corrective information. Moreover, as the missiles or aircraft approach the target area, they can be checked more frequently than others to insure accurate bombing operations and to prevent the need for sudden and drastic course corrections at the last moment.

While the tracking radar 14 normally utilizes its own transmitted and received signal for the tracking operations, it is apparent that tracking can be accomplished by homing on a beacon in the aircraft or missile in order to provide improved operation over greater distances.

As many changes could be made in the above construction and many different embodiments of this invention could be made without departing from the scope thereof, it is intended that all matter contained in the above description or shown in the accompanying drawing shall be interpreted as illustrative and not in a limiting sense.

What is claimed is:

1. Missile guidance apparatus comprising a tracking radar for cyclically and sequentially tracking a plurality of missiles, a data storage unit associated with each missile being tracked, means for introducing information relative to a predetermined missile position to said data storage units, programming means coupling said data storage units sequentially to said radar for directing said radar toward the position of the associated missiles to determine the error between each missile position and the position indicated by its associated data storage unit, means in said data storage units responsive to said error signals for determining course corrections for said missiles to direct them toward a selected target, and means for transmitting directed course information from each data storage unit to its associated missile to guide it toward said destination.

2. Missile guidance apparatus according to claim 1 including search radar means for locating a missile in flight and coordinating the missiles location with its associated data storage unit to automatically provide guidance information therefor.

3. Missile guidance apparatus according to claim 1 wherein each data storage unit includes means for continuously predicting the position of its associated missile between successive tracking periods whereby the error determined by the tracking radar is the difference between the predicted position of the missile and its actual position.

4. An improved radar tracking system comprising in combination, a directive radar antenna having azimuth and elevation drive motor means, radar receiver means coupled to said directive antenna for receiving reflected echo pulses, said radar receiver means including range, azimuth, and elevation error detector means, error converter means coupled to said range, azimuth, and elevation error detector means, said error converter means converting range, azimuth, and elevation error voltages of a target to be tracked into three rectangular coordinate error voltages, storage means coupled to said error converter means, said storage means converting said three rectangular coordinate error voltages into three rectangular coordinate position voltages, said storage means including means for storing said three position voltages, coordinate converter means coupled to said storage means, said coordinate converter means converting said rectangular coordinate position voltages into range, azimuth, and elevation position data, means coupling said azimuth position data to said azimuth drive motor means, means coupling said elevation position data to said elevation drive motor means, a range system, said range system being responsive to said range position data for producing range gating pulses, and means coupling said range gating pulses from said range system to said range, azimuth and elevation error detector means.

5. The improved radar tracking system as defined by claim 4 further comprising manual positioner means coupled to said storage means, said manual positioner means supplying rectangular coordinate positioning voltages to said storage means for manually positioning said directive antenna.

6. In a radar tracking system, including a radar receiver and a directive antenna, a servo positioning system for automatically positioning said directive radar antenna to track a selected target in space comprising in combination, error converter means coupled to said radar receiver, said error converter means receiving range, azimuth, and elevation error control voltages from said radar receiver, said error converter means converting said error contol voltages into three rectangular coordinate error voltages, storage means coupled to said error converter means, said storage means converting said three rectangular coordinate error voltages into three rectangular coordinate position voltages, said storage means including means for storing said three position voltages, coordinate converter means coupled to said storage means, said coordinate converter means converting said rectangular coordinate position voltages into range, azimuth, and elevation position data, azimuth drive motor means coupled to said directive radar antenna, means coupling said azimuth position data to said azimuth drive motor means, elevation drive motor means coupled to said directive radar antenna, means coupling said elevation position data to said elevation drive motor means, and means coupling said range position data to said radar receiver, said range position data providing range gating for said radar tracking system.

7. In a radar tracking system including a radar receiver for receiving reflected echo pulses and including a directive antenna, a servo positioning system for automatically positioning said directive radar antenna to track a target in space comprising in combination, error converter means coupled to said radar receiver for converting range, azimuth, and elevation error control voltages of a target to be tracked into three rectangular coordinate error voltages, storage means coupled to said error converter means for converting said three rectangular coordinate error voltages into three rectangular coordinate position voltages, said storage means including means for storing said three position voltages, coordinate converter means coupled to said storage means for converting said three position voltages into range, azimuth, and elevation position data, means coupling said azimuth and elevation position data to said directive antenna to position said antenna toward the target to be tracked, and means coupling said range position data to said radar receiver, said range position data providing range gating for said radar receiver.

8. The apparatus as defined by claim 7 further comprising means coupled to said servo positioning system for manually directing said antenna toward a selected target in space.

9. Missile guidance apparatus comprising in combination a radar tracking system for sequentially tracking a plurality of missiles, said radar tracking system including a radar receiver means and a directive antenna means, error converter means coupled to said receiver means, a plurality of data storage units, one data storage unit for each missile to be tracked, coordinate converter means coupled to said directive antenna means, switching means coupling each of said plurality of data storage units in sequence to said error converter means and said coordinate converter means, and manual positioner means coupled to said data storage units, said manual positioner means supplying position data of each missile to be tracked to the appropriate data storage unit.

10. A radar tracking system for tracking a group of targets in sequence comprising in combination, a radar transmitter, a radar receiver means, a directive antenna means coupled to said radar transmitter and receiver means, said directive antenna means including means for varying its pointing direction in both azimuth and elevation, error converter means coupled to the output of said receiver means, said error converter means converting polar coordinate output error control voltages into rectangular coordinate position data, coordinate converter means coupled to said directive antenna means, said coordinate converter means being adapted for converting rectangular coordinate position data into polar coordinate position data, means including a plurality of storage means intercoupled between said error converter means and said coordinate converter means, and switching means coupled to said means including a plurality of storage means for coupling each of said storage means in sequence between the output of said error converter means and the input of said coordinate converter means.

11. A time shared radar tracking system comprising in combination, a radar transmitter, a radar receiver means, a directive antenna means coupled to said radar transmitter and receiver means, said directive antenna means including azimuth and elevation drive motor means, error converter means coupled to said radar receiver means, a plurality of storage units for storing target position data, coordinate converter means coupled to said azimuth and elevation drive motor means, switching means coupling each of said plurality of data storage units in sequence to said error converter means and said coordinate converter means, and manual positioner means coupled to said data storage units, said manual positioner means providing initial target position data to each of said data storage units of the selected targets to be tracked.

References Cited in the file of this patent

UNITED STATES PATENTS

| | | |
|---|---|---|
| 2,492,355 | Campbell | Dec. 27, 1949 |
| 2,773,643 | Telling | Dec. 11, 1956 |
| 2,825,054 | Ernst | Feb. 25, 1958 |
| 2,891,244 | Pastoriza | June 16, 1959 |

OTHER REFERENCES

Electronics, March 1956; vol. 29, No. 3; pp. 168–170.